(12) United States Patent
Sirineni et al.

(10) Patent No.: US 12,499,279 B2
(45) Date of Patent: Dec. 16, 2025

(54) MACHINE LEARNING METHODS AND SYSTEMS FOR DETECTING PLATFORM SIDE-CHANNEL ATTACKS

(71) Applicant: Axiado Corporation, San Jose, CA (US)

(72) Inventors: Gopi Sirineni, San Jose, CA (US); Arasch Lagies, San Jose, CA (US); Raghu Kondapalli, San Jose, CA (US)

(73) Assignee: Axiado Corporation, San Jose, CA (US)

( * ) Notice: Subject to any disclaimer, the term of this patent is extended or adjusted under 35 U.S.C. 154(b) by 335 days.

(21) Appl. No.: 18/179,152

(22) Filed: Mar. 6, 2023

(65) Prior Publication Data
US 2023/0289482 A1 Sep. 14, 2023

Related U.S. Application Data

(60) Provisional application No. 63/318,599, filed on Mar. 10, 2022.

(51) Int. Cl.
*G06F 21/75* (2013.01)
(52) U.S. Cl.
CPC .................. *G06F 21/755* (2017.08)

(58) Field of Classification Search
CPC ..... G06F 21/755; G06F 21/552; G06F 21/554
See application file for complete search history.

(56) References Cited

U.S. PATENT DOCUMENTS

| | | | |
|---|---|---|---|
| 9,941,880 B1* | 4/2018 | Lesea | H03K 19/003 |
| 11,194,902 B2 | 12/2021 | Chen et al. | |
| 2009/0245109 A1 | 10/2009 | Hurley et al. | |
| 2021/0334415 A1* | 10/2021 | Yanamadala | G06F 21/552 |
| 2021/0382988 A1* | 12/2021 | Dekarz | G05B 23/024 |
| 2022/0035912 A1* | 2/2022 | Wilkerson | G06F 21/554 |
| 2023/0092190 A1 | 3/2023 | Homayoun et al. | |
| 2025/0077716 A1* | 3/2025 | Magen | G06F 21/755 |

OTHER PUBLICATIONS

Wang: A multinomial logistic regression modeling approach for anomaly intrusion detection. Computers & Security. 24(8):662-674 doi:10.1016/j.cose.2005.05.003 (2005).

* cited by examiner

*Primary Examiner* — Phy Anh T Vu
(74) *Attorney, Agent, or Firm* — Wilson Sonsini Goodrich & Rosati

(57) ABSTRACT

Provided herein are method and systems for detecting a side-channel attack on a target in a network, comprising conducting a training operation comprising collecting measurements of a physical parameter of a target over a period of time and conducting a detection operation comprising monitoring the physical parameter of the target.

34 Claims, 12 Drawing Sheets

Temperature Normal Decrease
Temperature increase (e.g. due to day to night change) in a normal range Voltage Anomaly Slow Slope at Addition of Load

Voltage Anomaly with Normal Sharp Slope

MACHINE LEARNING METHODS AND SYSTEMS FOR DETECTING PLATFORM SIDE-CHANNEL ATTACKS

CROSS-REFERENCE TO RELATED APPLICATIONS

This application claims the benefit of U.S. Provisional Application No. 63/318,599, filed Mar. 10, 2022, which is incorporated herein by reference in its entirety.

BACKGROUND

Deployed infrastructure products, such as in data centers, edge, network etc., are susceptible to physical tampering and/or probing based attacks. The sophistication of the attacks have increased due to state actors hacking hardware systems to either disrupt the operation of the equipment and/or steal private or confidential information, such as root keys, deciphering specific crypto algorithms used, etc. Such physical intervention based attacks are referred to as side-channel attacks.

SUMMARY

Detecting side-channel attacks have become increasingly difficult for traditional circuits/logic within hardware. Most systems rely on a tamper sensor or a variation thereof, which should be trigger when an attack is in progress. However, these sensors may be easy to get around, which can cause them to fail to detect the attack, as well as fail to deploy a correction mechanism during an ongoing attack.

As an example, one method of attack includes creating a voltage glitch on the supply voltages to a server processor. The timing of this glitch can be done right around when the chip is validating a prior loaded boot image or signature verification. This glitch creates momentary instability in the hardware and its behavior can be unpredictable. Traditional solutions, such as tamper sensors, tend to detect such glitches, e.g., in the voltage, current, temperature, clocks etc., using instantaneous values. However, new age attacks can modify these platform vitals over some time. Therefore, new types of solutions are needed to monitor platform vitals over a period of time and detect aberrations.

In one aspect, disclosed herein is a computer-implemented method of detecting a side-channel attack on a target in a network comprising: a) conducting a training operation comprising: i. collecting measurements of a physical parameter of the target over a period of time under controlled conditions; ii. calculating, for each measurement, a first derivative and a second derivative relative to previous measurements; iii. performing parameter normalization with respect to the measurements, the first derivatives, and the second derivatives; iv. generating a raw dataset comprising the normalized measurements, first derivatives, and second derivatives; v. calculating a statistical summary of the raw dataset; and vi. applying a machine learning model to the statistical summary to determine a threshold for the physical parameter of the target; and b) conducting a detection operation comprising: i. monitoring the physical parameter of the target; and ii. comparing the physical parameter to the threshold to detect an anomaly in real-time. In some embodiments, the physical parameter comprises a system temperature of the target or a processor temperature of the target. In some embodiments, the physical parameter comprises a supply voltage of the target or a part of the target. In some embodiments, the physical parameter comprises a current of the target or a part of the target. In some embodiments, the physical parameter comprises a clock frequency or a clock duty cycle of the target. In some embodiments, the statistical summary comprises averages and standard deviations of the dataset over previously collected samples. In some embodiments, the threshold comprises one or more of: a magnitude, a velocity, and an acceleration of the physical parameter. In some embodiments, applying the machine learning model to the statistical summary to determine a threshold for the physical parameter of the target comprises applying a machine learning model to determine one or more of: an upper alarm threshold and a lower alarm threshold. In some embodiments, applying the machine learning model to the statistical summary to determine a threshold for the physical parameter of the target comprises applying a machine learning model to determine one or more of: an upper warning threshold and a lower warning threshold. In some embodiments, the machine learning model comprises a neural network (NN). In some embodiments, the machine learning model comprises a deep neural network (DNN). In some embodiments, the machine learning model comprises a convolutional neural network (CNN). In some embodiments, the machine learning model comprises a one-class CNN. In some embodiments, the machine learning model comprises a recurrent neural network (RNN). In some embodiments, the machine learning model comprises a graph neural network (GNN). In some embodiments, the machine learning model comprises a convolutional graph neural network (CGNN). In some embodiments, the machine learning model comprises a transformer. In some embodiments, applying a machine learning model to the statistical summary to determine a threshold for the physical parameter of the target is performed at an edge device in the network. In some embodiments, the machine learning model comprises a support-vector machine (SVM). In some embodiments, the machine learning model comprises a one-class SVM. In some embodiments, the machine learning model comprises a k-nearest neighbor (KNN) algorithm. In some embodiments, the machine learning model comprises an isolation forest algorithm. In some embodiments, the method further comprises applying a machine learning model to the raw dataset to detect an anomaly in the physical parameter in real-time. In some embodiments, the machine learning model comprises: a neural network (NN), a transformer, support-vector machine (SVM), a k-nearest neighbor (KNN) algorithm, or an isolation forest algorithm. In some embodiments, comparing the physical parameter to the threshold to detect an anomaly in real-time comprises comparing one or more of: a magnitude, a velocity, and an acceleration of the physical parameter. In some embodiments, the method further comprises changing the threshold based on an anomaly detected in real-time to achieve adaptive thresholding. In some embodiments, the method further comprises preventing an anomaly in the physical parameter in real-time. In some embodiments, preventing the anomaly comprises one or more of: sending a notification, quiescing a clock, preventing booting or rebooting. In some embodiments, the method further comprises predicting an anomaly in the physical parameter in real-time.

In another aspect, disclosed herein is a computer-implemented system comprising: at least one processor and instructions executable by the at least one processor to provide an application for detecting a side-channel attack on a target in a network, the application comprising: a) a thresholding module configured to perform operations comprising: i. collecting measurements of a physical parameter of the target over a period of time under controlled conditions; ii. calculating, for each measurement, a first derivative and a second derivative relative to previous measurements; iii. performing parameter normalization with respect to the measurements, the first derivatives, and the second derivatives; iv. generating a raw dataset comprising the normalized measurements, first derivatives, and second derivatives; v. calculating a statistical summary of the raw dataset; and vi. applying a machine learning model to the statistical summary to determine a threshold for the physical parameter of the target; and b) a detection module configured to perform operations comprising: i. monitoring the physical parameter of the target; and ii. comparing the physical parameter to the threshold to detect an anomaly in real-time. In some embodiments, the one or more of: the thresholding module and the detection module are implemented at an edge device in the network. In some embodiments, the one or more of: the thresholding module and the detection module are implemented at the target in the network.

In further aspect, disclosed herein is a computer-implemented system for detecting a side-channel attack on a target in a network comprising: a) a memory communicatively coupled to the network; b) at least one first processor communicatively coupled to the network and configured to perform operations comprising: i. collecting training measurements of a physical parameter of the target over a period of time under controlled conditions and storing the training measurements in the memory; and ii. monitoring the physical parameter of the target in real-time and storing the real-time measurements in the memory; and c) at least one second processor communicatively coupled to the network and configured to perform operations comprising: i. accessing the training measurements of the physical parameter of the target; ii. calculating, for each training measurement, a first derivative and a second derivative relative to previous measurements; iii. performing parameter normalization with respect to the training measurements, the first derivatives, and the second derivatives; iv. generating a raw dataset comprising the normalized measurements, first derivatives, and second derivatives; v. calculating a statistical summary of the raw dataset; vi. applying a machine learning model to the statistical summary to determine a threshold for the physical parameter of the target; vii. accessing the real-time measurements to monitor the physical parameter of the target; and viii. comparing the physical parameter to the threshold to detect an anomaly in real-time.

In further aspect, disclosed herein is a computer-implemented system for detecting a side-channel attack on a target in a network comprising: a) a memory communicatively coupled to the network; b) at least one first processor communicatively coupled to the network and configured to perform operations comprising: i. collecting training measurements of a physical parameter of the target over a period of time under controlled conditions and storing the training measurements in the memory; ii. calculating, for each training measurement, a first derivative and a second derivative relative to previous measurements; iii. performing parameter normalization with respect to the training measurements, the first derivatives, and the second derivatives; iv. generating a raw dataset comprising the normalized measurements, first derivatives, and second derivatives; v. calculating a statistical summary of the raw dataset; vi. applying a machine learning model to the statistical summary to determine a threshold for the physical parameter of the target; and vii. monitoring the physical parameter of the target in real-time and storing the real-time measurements in the memory; and b) at least one second processor communicatively coupled to the network and configured to perform operations comprising: i. accessing the real-time measurements to monitor the physical parameter of the target; and ii. comparing the physical parameter to the threshold to detect an anomaly in real-time.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
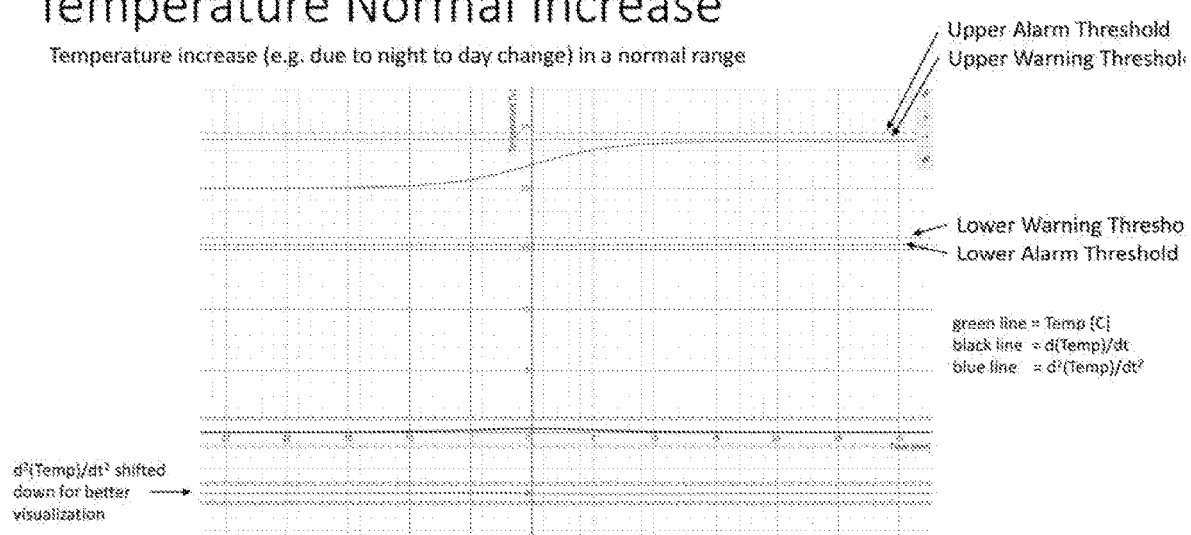
FIG. 1 shows a non-limiting example of a normal temperature increase in a system.

Described herein, in certain embodiments, is a computer-implemented method of detecting a side-channel attack on a target in a network comprising: a) conducting a training operation comprising: i. collecting measurements of a physical parameter of the target over a period of time under controlled conditions; ii. calculating, for each measurement, a first derivative and a second derivative relative to previous measurements; iii. performing parameter normalization with respect to the measurements, the first derivatives, and the second derivatives; iv. generating a raw dataset comprising the normalized measurements, first derivatives, and second derivatives; v. calculating a statistical summary of the raw dataset; and vi. applying a machine learning model to the statistical summary to determine a threshold for the physical parameter of the target; and b) conducting a detection operation comprising: i. monitoring the physical parameter of the target; and ii. comparing the physical parameter to the threshold to detect an anomaly in real-time.

Also described herein, in certain embodiments, is a computer-implemented system comprising: at least one processor and instructions executable by the at least one processor to provide an application for detecting a side-channel attack on a target in a network, the application comprising: a) a thresholding module configured to perform operations comprising: i. collecting measurements of a physical parameter of the target over a period of time under controlled conditions; ii. calculating, for each measurement, a first derivative and a second derivative relative to previous measurements;

iii. performing parameter normalization with respect to the measurements, the first derivatives, and the second derivatives; iv. generating a raw dataset comprising the normalized measurements, first derivatives, and second derivatives; v. calculating a statistical summary of the raw dataset; and vi. applying a machine learning model to the statistical summary to determine a threshold for the physical parameter of the target; and b) a detection module configured to perform operations comprising: i. monitoring the physical parameter of the target; and ii. comparing the physical parameter to the threshold to detect an anomaly in real-time.

Further described herein, in certain embodiments, is a computer-implemented system for detecting a side-channel attack on a target in a network comprising: a) a memory communicatively coupled to the network; b) at least one first processor communicatively coupled to the network and configured to perform operations comprising: i. collecting training measurements of a physical parameter of the target over a period of time under controlled conditions and storing the training measurements in the memory; and ii. monitoring the physical parameter of the target in real-time and storing the real-time measurements in the memory; and c) at least one second processor communicatively coupled to the network and configured to perform operations comprising: i. accessing the training measurements of the physical parameter of the target; ii. calculating, for each training measurement, a first derivative and a second derivative relative to previous measurements; iii. performing parameter normalization with respect to the training measurements, the first derivatives, and the second derivatives; iv. generating a raw dataset comprising the normalized measurements, first derivatives, and second derivatives; v. calculating a statistical summary of the raw dataset; vi. applying a machine learning model to the statistical summary to determine a threshold for the physical parameter of the target; vii. accessing the real-time measurements to monitor the physical parameter of the target; and viii. comparing the physical parameter to the threshold to detect an anomaly in real-time.

Further described herein, in certain embodiments, is a computer-implemented system for detecting a side-channel attack on a target in a network comprising: a) a memory communicatively coupled to the network; b) at least one first processor communicatively coupled to the network and configured to perform operations comprising: i. collecting training measurements of a physical parameter of the target over a period of time under controlled conditions and storing the training measurements in the memory; ii. calculating, for each training measurement, a first derivative and a second derivative relative to previous measurements; iii. performing parameter normalization with respect to the training measurements, the first derivatives, and the second derivatives; iv. generating a raw dataset comprising the normalized measurements, first derivatives, and second derivatives; v. calculating a statistical summary of the raw dataset; vi. applying a machine learning model to the statistical summary to determine a threshold for the physical parameter of the target; and vii. monitoring the physical parameter of the target in real-time and storing the real-time measurements in the memory; and b) at least one second processor communicatively coupled to the network and configured to perform operations comprising: i. accessing the real-time measurements to monitor the physical parameter of the target; and ii. comparing the physical parameter to the threshold to detect an anomaly in real-time.

Deployed infrastructure products, such as in data centers, edge, network etc., are susceptible to physical tampering and/or probing based attacks. The infrastructure edge can encompass networks that connect Internet of Things (IoT) endpoints and devices, such as but not limited to, access points, switches, enterprise or residential gateways and routers, wireless LAN controllers, universal customer premise equipment (uCPE). In some instances, the endpoints and devices are connected to one or more data centers. These attacks can be deceptive or can be an attempt to access and/or steal private or confidential information. In some instances, the private or confidential information comprises one or more of keys, passwords, private records, or crypto algorithms. In some instances, the attack is an attempt to bypass security.

The attack can include creating a glitch that disrupts the vitals of a platform. Non-limiting examples of the glitch in the platform vitals include a glitch in the voltage, current, temperature, or clocks. As an example, during boot process (e.g., at the time firmware is being loaded onto a chip), an attacker can disrupt the voltage to bypass chip security. In such an example, an attacker can load their own firmware and take over the chip (e.g., temporarily or permanently). In some instances, voltages are managed with power management integrated circuits (PMICs) and voltages (or temperature) can be used to trigger a reboot. In some examples, this is accompanied by a voltage spike. In some examples, this can also cause a spike in temperature by faking sensor data (e.g., showing artificially low temperatures). This can cause more workload to be directed to that machine. In some instances, clocks can be directly manipulated (e.g., stretched), which can change the duty cycle of the clock.

Provided herein are approaches that can be applied to a physical parameter, including a measurement, on the system that is being protected against side-channel attacks. In some instances, a side-channel attack comprises a security exploit in which information is gained from the implementation of a computer system. In some examples, the implementation of the computer system comprises measuring or exploiting indirect effects of the system or its hardware to gain information from and/or influence the program execution of a system. In some instances, the side-channel attack does not comprise a security exploit due to weaknesses in the implemented algorithms (e.g., software bugs). In some instances, the side-channel attack does not directly target a program, algorithm, code, etc. of the system.

In some instances, physical measurements, such as those described herein, can be used to detect anomalies or outlier data associated with a system. In some instances, quantities associated with physical measurements (e.g., derivatives), can be used to detect anomalies or outlier data associated with a system. In some instances, the physical measurement comprises any one of a voltage, a current, a temperature, a clock, or any combination thereof. In some examples, the voltage comprises a supply voltage. In some examples, the current comprises a current flowing through the system, part of the system, or a combination thereof. In some examples, the temperature comprises a local temperature, an ambient temperature, or a combination thereof. In some examples, the clock comprises an internal clock, an external clock or a combination thereof.

Quantities associated with physical measurements, such as those described herein, can comprise derivatives. In some instances, the derivatives comprise a first order, second order, third order, or any higher order derivative of a physical measurement. For example, given a physical measurement $\varphi$, associated quantities such as a first time derivative $\dot{\varphi}$ (e.g., $\dot{\varphi}=d\varphi/dt$) and a second time derivative $\ddot{\varphi}$ (e.g., $\ddot{\varphi}=d\dot{\varphi}/dt$) can be used to detect anomalies or outlier data associated with a system.

Anomaly Detection Models

In some instances, raw datasets, such as the measurement or its derivatives (e.g., φ, φ̇, φ̈, etc.) can be used to detect anomalies or outlier data using machine learning approaches. In some instances, the one or more machine learning (ML) approaches are supervised, semi-supervised, or unsupervised for training to detect anomalies or outlier data. In some instances, the one or more ML approaches perform classification or clustering to detect anomalies or outlier data. In some examples, the machine learning approach comprises a classical machine learning method, such as, but not limited to, support vector machine (SVM) (e.g., one-class SVM), K-nearest neighbor (KNN), isolation forest, random forest, or any combination thereof. In some examples, the machine learning approach comprises a deep leaning method (e.g., deep neural network (DNN)), such as, but not limited to a convolutional neural network (CNN) (e.g., one-class CNN), recurrent neural network (RNN), transformer, graph neural network (GNN), convolutional graph neural network (CGNN), or any combination thereof.

In some embodiments, a classical ML method comprises one or more algorithms that learns from existing observations (i.e., known features) to predict outputs. In some embodiments, the one or more algorithms perform clustering of data. In some examples, the classical ML algorithms for clustering comprise K-means clustering, mean-shift clustering, density-based spatial clustering of applications with noise (DBSCAN), expectation-maximization (EM) clustering (e.g., using Gaussian mixture models (GMM)), agglomerative hierarchical clustering, or any combination thereof. In some embodiments, the one or more algorithms perform classification of data. In some examples, the classical ML algorithms for classification comprise logistic regression, naïve Bayes, KNN, random forest, isolation forest, decision trees, gradient boosting, support vector machine (SVM), or any combination thereof. In some examples, the SVM comprises a one-class SMV or a multi-class SVM.

In some embodiments, the deep learning method comprises one or more algorithms that learns by extracting new features to predict outputs. In some embodiments, the deep learning method comprises one or more layers. In some embodiments, the deep learning method comprises a neural network (e.g., DNN comprising more than one layer). Neural networks generally comprise connected nodes in a network, which can perform functions, such as transforming or translating input data. In some embodiments, the output from a given node is passed on as input to another node. The nodes in the network generally comprise input units, hidden units, output units, or a combination thereof. In some embodiments, an input node is connected to one or more hidden units. In some embodiments, one or more hidden units is connected to an output unit. The nodes can generally take in input through the input units and generate an output from the output units using an activation function. In some embodiments, the input or output comprises a tensor, a matrix, a vector, an array, or a scalar. In some embodiments, the activation function is a Rectified Linear Unit (ReLU) activation function, a sigmoid activation function, a hyperbolic tangent activation function, or a Softmax activation function.

The connections between nodes further comprise weights for adjusting input data to a given node (i.e., to activate input data or deactivate input data). In some embodiments, the weights are learned by the neural network. In some embodiments, the neural network is trained to learn weights using gradient-based optimizations. In some embodiments, the gradient-based optimization comprises one or more loss functions. In some embodiments, the gradient-based optimization is gradient descent, conjugate gradient descent, stochastic gradient descent, or any variation thereof (e.g., adaptive moment estimation (Adam)). In some further embodiments, the gradient in the gradient-based optimization is computed using backpropagation. In some embodiments, the nodes are organized into graphs to generate a network (e.g., graph neural networks). In some embodiments, the nodes are organized into one or more layers to generate a network (e.g., feed forward neural networks, convolutional neural networks (CNNs), recurrent neural networks (RNNs), etc.). In some embodiments, the CNN comprises a one-class CNN or a multi-class CNN. In some embodiments, the nodes are organized as a graph data structure (e.g., graph neural network (GNN), graph convolutional networks (GCN), etc.).

In some embodiments, the neural network comprises one or more recurrent layers. In some embodiments, the one or more recurrent layers are one or more long short-term memory (LSTM) layers or gated recurrent units (GRUs). In some embodiments, the one or more recurrent layers perform sequential data classification and clustering in which the data ordering is considered (e.g., time series data). In such embodiments, future predictions are made by the one or more recurrent layers according to the sequence of past events. In some embodiments, the recurrent layer retains or "remembers" important information, while selectively "forgets" what is not essential to the classification.

In some embodiments, the neural network comprise one or more convolutional layers. In some embodiments, the input and the output are a tensor representing variables or attributes in a data set (e.g., features), which may be referred to as a feature map (or activation map). In such embodiments, the one or more convolutional layers are referred to as a feature extraction phase. In some embodiments, the convolutions are one-dimensional (1D) convolutions, two-dimensional (2D) convolutions, three-dimensional (3D) convolutions, or any combination thereof. In further embodiments, the convolutions are 1D transpose convolutions, 2D transpose convolutions, 3D transpose convolutions, or any combination thereof.

The layers in a neural network can further comprise one or more pooling layers before or after a convolutional layer. In some embodiments, the one or more pooling layers reduces the dimensionality of a feature map using filters that summarize regions of a matrix. In some embodiments, this down samples the number of outputs, and thus reduces the parameters and computational resources needed for the neural network. In some embodiments, the one or more pooling layers comprises max pooling, min pooling, average pooling, global pooling, norm pooling, or a combination thereof. In some embodiments, max pooling reduces the dimensionality of the data by taking only the maximums values in the region of the matrix. In some embodiments, this helps capture the most significant one or more features. In some embodiments, the one or more pooling layers is one-dimensional (1D), two-dimensional (2D), three-dimensional (3D), or any combination thereof.

The neural network can further comprise of one or more flattening layers, which can flatten the input to be passed on to the next layer. In some embodiments, a input (e.g., feature map) is flattened by reducing the input to a one-dimensional array. In some embodiments, the flattened inputs can be used to output a classification of an object. In some embodiments, the classification comprises a binary classification or multi-class classification of visual data (e.g., images, videos, etc.) or non-visual data (e.g., measurements, audio, text, etc.). In some embodiments, the classification comprises binary classification of an image (e.g., cat or dog). In some embodiments, the classification comprises multi-class classification of a text (e.g., identifying hand-written digits)). In some embodiments, the classification comprises binary classification of a measurement. In some examples, the binary classification of a measurement comprises a classification of a system's performance using the physical measurements described herein (e.g., normal or abnormal, normal or anormal).

The neural networks can further comprise of one or more dropout layers. In some embodiments, the dropout layers are used during training of the neural network (e.g., to perform binary or multi-class classifications). In some embodiments, the one or more dropout layers randomly set some weights as 0 (e.g., about 10%, 20%, 30%, 40%, 50%, 60%, 70%, 80% of weights). In some embodiments, the setting some weights as 0 also sets the corresponding elements in the feature map as 0. In some embodiments, the one or more dropout layers can be used to avoid the neural network from overfitting.

The neural network can further comprise one or more dense layers, which comprises a fully connected network. In some embodiments, information is passed through a fully connected network to generate a predicted classification of an object. In some embodiments, the error associated with the predicted classification of the object is also calculated. In some embodiments, the error is backpropagated to improve the prediction. In some embodiments, the one or more dense layers comprises a Softmax activation function. In some embodiments, the Softmax activation function converts a vector of numbers to a vector of probabilities. In some embodiments, these probabilities are subsequently used in classifications, such as classifications of states in a control system as described herein. In some embodiments, the classifications of states from one or more components in a control system is compared to detect the occurrence of an anomaly or outlier data.

Anomaly Detection in Side-Channel Attacks

The anomaly detection models described herein can be used to detect anomalies or outlier data in the physical measurements of a system. In some instances, the physical measurements of the system are referred to as physical parameters of the system. In some instances, detecting the anomalies or outlier data comprise detecting a side-channel attack on a system, such as a target in a network. In some examples, the target comprises, but is not limited to, a primitive, protocol, module, device, or any combination thereof. In some examples, the side-channel attack comprises, but is not limited to a timing attack, an electromagnetic attack, a simple power analysis, a differential power analysis, a template attack, or any combination thereof.

In some instances, a method of detecting a side-channel attack on a target in a network comprises conducting a training operation. In some instances, the training operation comprises collecting measurements of a physical parameter of a target over a period of time under controlled conditions. In some examples, the physical parameter comprises a system temperature of the target, a processor temperature of the target, or a combination thereof. In some examples, the physical parameter comprises a supply voltage of the target, a part of the target, or a combination thereof. In some examples, the physical parameter comprises a current of the target, a part of the target, or a combination thereof. In some examples, a clock frequency, a clock duty cycle of the target, or a combination thereof. In some examples, the physical parameter comprises raw data of the physical parameters described herein (e.g., $\varphi$, $\dot{\varphi}$, $\ddot{\varphi}$, etc.). In some examples, the physical parameter comprises raw data comprising magnitudes the physical parameters described herein (e.g., $|\varphi|$, $|\dot{\varphi}|$, $|\ddot{\varphi}|$, etc.). In some instances, the training operation comprises calculating, for each measurement, a first derivative and a second derivative relative to previous measurements. In some examples, the first derivative of the raw data comprises the velocity (e.g., $\dot{\varphi}=d\varphi/dt$). In some examples, the raw data comprises the second derivative of the raw data. In some examples, the second derivative of the raw data comprises the acceleration (e.g., $\ddot{\varphi}=d\dot{\varphi}/dt$). In some instances, the training operation comprises performing parameter normalization with respect to the measurements, the first derivatives, and the second derivatives. In some instances, the training operation comprises generating a raw dataset comprising the normalized measurements, first derivatives, and second derivatives. In some instances, the training operation comprises calculating a statistical summary of the raw dataset. In some instances, the statistical summary comprises averages of the raw data (e.g., $\bar{\varphi}$, $\bar{\dot{\varphi}}$, $\bar{\ddot{\varphi}}$), standard deviations (e.g., $\sigma(\varphi)$, $\sigma(\dot{\varphi})$, $\sigma(\ddot{\varphi})$), or a combination thereof. In some instances, the statistical summary further comprises variance of the raw data (e.g., $\sigma^2(\varphi)$, $\sigma^2(\dot{\varphi})$, $\sigma^2(\ddot{\varphi})$).

In some instances, the physical parameters comprising the raw data set (e.g., $\varphi$, $\dot{\varphi}$, $\ddot{\varphi}$, $|\varphi|$, $|\dot{\varphi}|$, $|\ddot{\varphi}|$, etc.), the statistical summary (e.g., $\bar{\varphi}$, $\bar{\dot{\varphi}}$, $\bar{\ddot{\varphi}}$, $\sigma(\varphi)$, $\sigma(\dot{\varphi})$, $\sigma(\ddot{\varphi})$, $\sigma^2(\varphi)$, $\sigma^2(\dot{\varphi})$, $\sigma^2(\ddot{\varphi})$, etc.), or any combination thereof is stored in a file and/or updated at the start of an anomaly detection program. In some instances, the physical parameters are updated during the anomaly detection (e.g., in the detection module) to resolve false detections. In some examples, the physical parameters comprise the raw data set: $\varphi$, $\dot{\varphi}$, $\ddot{\varphi}$, averages: $\bar{\varphi}$, $\bar{\dot{\varphi}}$, $\bar{\ddot{\varphi}}$, and standard deviations: $\sigma(\varphi)$, $\sigma(\dot{\varphi})$, $\sigma(\ddot{\varphi})$. In some examples, these physical parameters are collected and/or calculated over a last N samples in the measurement of $\varphi$ (e.g., voltage, temperature, current, clock, etc.). In some instances, by using the statistical summary, rather than raw data measurements, less memory is required for anomaly detection. In some instances, requiring less memory allows for the anomaly detection methods and systems described herein to be performed at the edge in real-time.

In some instances, the training operation comprises applying a machine learning model to the raw data (e.g., physical parameter, first derivative, second derivative, etc.). In some instances, the training operation comprises applying a machine learning model to the statistical summary. In some instances, the machine learning model comprises a classical ML method, such as those described herein. In some examples, the classical ML method requires les intensive calculations compared to a deep learning method. In some examples, the classical ML method requires one or more physical parameters. In some examples, the one or more single parameters are stored on a memory. In some examples, the memory is an edge device. In some examples, the classical ML method allows for data processing on an edge device. In some examples, the classical ML method allows for data processing in real-time. In some examples, the classical ML method allows for data processing on an edge device in real-time. In some instances, the machine learning model comprises a deep learning method, such as those described herein. In some examples, the deep learning method requires storing model-parameters. In some examples, the deep learning method requires more intensive calculations as compared to a classical ML method. In some examples, the deep learning method will not allow data processing on an edge device. In some examples, the edge device is a low power edge device. In some examples, the deep learning method does not allow data processing in real-time. In some examples, the deep learning method does not allow data processing in real-time on an edge device.

In some instances, a machine learning model is applied to determine a threshold for the physical parameter of the target. In some instances, applying the machine learning model to the statistical summary to determine a threshold for the physical parameter of the target comprises applying a machine learning model to determine one or more of: an upper alarm threshold and a lower alarm threshold. In some instances, applying the machine learning model to the statistical summary to determine a threshold for the physical parameter of the target comprises applying a machine learning model to determine one or more of: an upper warning threshold and a lower warning threshold. In some instances, the thresholds described herein (e.g., upper alarm threshold, lower alarm threshold, upper warning threshold, lower warning threshold, etc.) can be determined empirically.

In some instances, the thresholds are computed using a buffer $\Delta$. In some instances, the threshold comprises a sum of the physical parameter $\varphi$, the standard deviation $\sigma(\varphi)$, and the buffer $\Delta$ (e.g., $\varphi + \sigma(\varphi) + \Delta$). In some instances, the detection of an anomaly or an outlier in the data comprising physical measurements is performed using threshold comparisons. For example, an anomaly can be overshot if any one of: $(\varphi+\lambda) > (\overline{\varphi}+\sigma(\varphi)+\Delta)$ or $(\dot{\varphi}) > (\overline{\dot{\varphi}}+\sigma(\dot{\varphi})+\Delta_v)$ or $(\ddot{\varphi}) > (\overline{\ddot{\varphi}}+\sigma(\ddot{\varphi})+\Delta_a)$. For example, an anomaly can be undershot if any one of: $(\varphi-\lambda) < (\overline{\varphi}-\sigma(\varphi)-\Delta)$ or $(\dot{\varphi}) < (\overline{\dot{\varphi}}-\sigma(\dot{\varphi})-\Delta_v)$ or $(\ddot{\varphi}) < (\overline{\ddot{\varphi}}-\sigma(\ddot{\varphi})-\Delta_a)$. Here, $\Delta_v$ is buffer associated with the first time derivative (e.g., the velocity buffer) and $\Delta_a$ is buffer associated with the second time derivative (e.g., the acceleration buffer). In some instances, the buffers (e.g., $\Delta$, $\Delta_v$, $\Delta_a$, etc.) reduce false detections due to noise measurements. In some instances, the limit can be set to zero for a static overshoot/undershoot threshold. In some instances, this can allow the threshold to react to normal changes (e.g., day/night fluctuations in temperature). In such instances, $\lambda$ can be described as: $\lambda = \overline{\varphi}+\sigma(\varphi)+\Delta+\Delta_v \times \dot{\varphi}+\ddot{\varphi}+\Delta_a$. In some instances, the limit $\lambda$ can be set not to zero for a dynamic overshoot/undershoot threshold (e.g., adaptive thresholding). In some instances, dynamically changing one or more thresholds comprises adaptive thresholding. In some instances, using adaptive thresholding, one or more thresholds can be more relaxed compared to static thresholds. In some instances, using adaptive thresholding, one or more thresholds can be tightened when an unusual behavior in a physical parameter is detected.

In some instances, a method of detecting a side-channel attack on a target in a network comprises conducting a detection operation. In some instances, the detection operation comprises monitoring the physical parameter of the target. In some instances, the detection operation comprises comparing the physical parameter to the threshold to detect an anomaly in real-time. In some instances, the method further comprises changing the threshold based on an anomaly detected in real-time to achieve adaptive thresholding. In some instances, adaptive thresholding is done using a machine learning approach described herein. In some examples, adaptive thresholding comprises changing the frequency that a physical parameter is measured. In some examples, adaptive thresholding comprises changing an upper alarm threshold, a lower alarm threshold, or a combination thereof. In some examples, adaptive thresholding comprises changing an upper warning threshold, a lower warning threshold, or a combination thereof. In some instances, when a warning threshold or an alarm threshold is reached, a warning or an alarm, respectively, is triggered. In some instances, when a warning or an alarm is triggered, a flag is raised in the system. In some instances, when a warning or an alarm is triggered, one or more clocks (e.g., internal or external) is quiesced to prevent booting. In some instances, when a warning or an alarm is triggered, then a notification is sent to a user or an admin of the system.

Exemplary diagrams of a system temperature are provided in FIGS. 1-4 to illustrate a side-channel attack on temperature. In some instances, an integrated circuit or system temperature can be measured using internal circuitry, a dedicated sensor (e.g., Adafruit BME280), or a combination thereof. In some instances, a training procedure (e.g., using a training module) is used to collect N temperature measurement samples. In some instances, N samples are collected under controlled conditions. In some instances, a statistical summary comprising averages $\overline{T}$, standard deviations $\sigma(T)$, variance $\sigma^2(T)$, or a combination thereof are calculated from the N samples. In some instances, the calculated statistical summary is used to determine a buffer value for the alarm thresholds and warning thresholds. In some examples, the alarm thresholds, the warning thresholds, or both are determined empirically. In some examples, the alarm thresholds, the warning thresholds, or both are determined using a machine-learning approach described herein. In some examples, the machine learning approach is an SVM or NN.

In some instances, an upper alarm thresholds is equal to a sum of the average, standard deviation, and alarm threshold buffer (e.g., $\overline{T}+\sigma(T)+AB(T)$). In some instances, the lower alarm thresholds is equal to the negative sum of the average, standard deviation, and alarm threshold buffer (e.g., $\overline{T}-\sigma(T)-AB(T)$). In some instances, the upper and lower alarm thresholds for the velocity $\dot{T}$ is similarly calculated (e.g., $\overline{\dot{T}}+\sigma(\dot{T})+AB(\dot{T})$ and $\overline{\dot{T}}-\sigma(\dot{T})-AB(\dot{T})$, respectively). In some instances, the upper and lower alarm thresholds for the acceleration $\ddot{T}$ are similarly calculated (e.g., $\overline{\ddot{T}}+\sigma(\ddot{T})+AB(\ddot{T})$ and $\overline{\ddot{T}}-\sigma(\ddot{T})-AB(\ddot{T})$, respectively). In some instances, the upper warning thresholds are equal to a sum of the average, standard deviation, and warning threshold buffer (e.g., $\overline{T}+\sigma(T)+WB(T)$). In some instances, the lower warning thresholds are equal to the negative sum of the average, standard deviation, and warning threshold buffer (e.g., $\overline{T}-\sigma(T)-WB(T)$). In some instances, the upper and lower warning thresholds for the velocity $\dot{T}$ are similarly calculated (e.g., $\overline{\dot{T}}+\sigma(\dot{T})+AB(\dot{T})$ and $\overline{\dot{T}}-\sigma(\dot{T})-WB(\dot{T})$, respectively). In some instances, the upper and lower warning thresholds for the acceleration $\ddot{T}$ are similarly calculated (e.g., $\overline{\ddot{T}}+\sigma(\ddot{T})+WB(\ddot{T})$ and $\overline{\ddot{T}}-\sigma(\ddot{T})-WB(\ddot{T})$, respectively).

Figure 2:
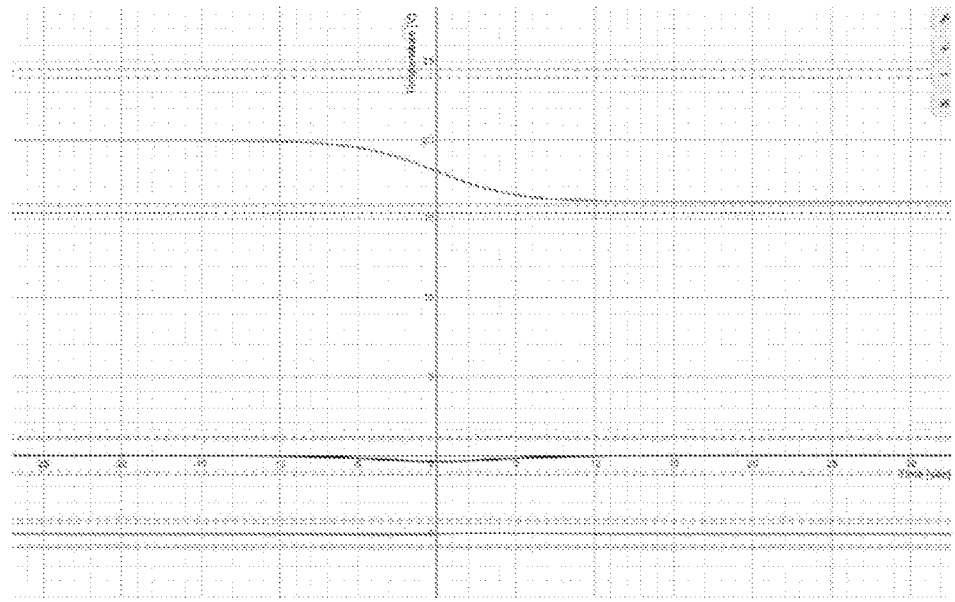
FIG. 2 shows a non-limiting example of a normal temperature decrease in a system.

In some instances, a normal temperature change occurs in a system. In some examples, the normal temperature change occurs due to a change from night to day or from day to night, as shown in FIG. 1 and FIG. 2, respectively. In such instances, the temperature remains in a normal range within the upper warning and lower warning thresholds. In some instances, the velocity and acceleration of the temperature measurements also remain within the thresholds.

Figure 3:
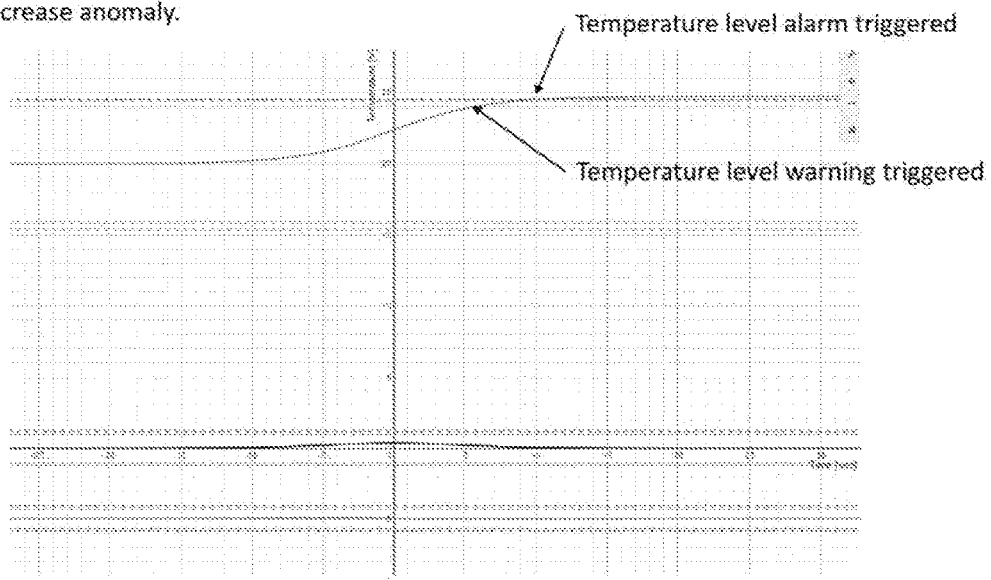
FIG. 3 shows a non-limiting example of an anormal slow temperature increase in a system.
Figure 4:
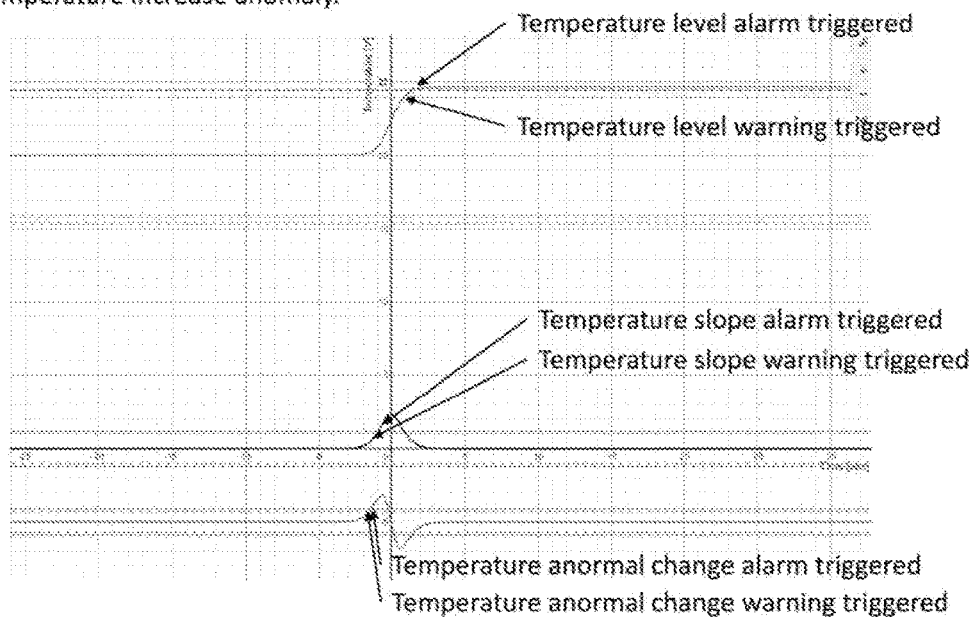
FIG. 4 shows a non-limiting example of an anormal fast temperature increase in a system.

In some instances, during a side-channel attack, the temperature measurements increase abnormally slow or fast, as shown in FIG. 3 and FIG. 4, respectively. In some instances, the temperature measurement increases slowly to a level surpassing both the warning threshold and alarm threshold (FIG. 3). In some examples, a warning, an alarm, or a combination thereof is triggered. In some examples, a warning, an alarm, or a combination thereof is not triggered. In some instances, the temperature measurement increases fast to a level surpassing both the warning threshold and alarm threshold (FIG. 4). In some examples, a warning, an alarm, or a combination thereof is triggered. In some examples, a warning, an alarm, or a combination thereof is not triggered.

Exemplary diagrams of a system voltage are provided in FIGS. 5-8 to illustrate a side-channel attack on voltage. In some instances, an integrated circuit or system voltage can be measured using internal circuitry, a dedicated sensor (e.g., Adafruit INA260), or a combination thereof. In some instances, similar approaches as illustrated in FIGS. 5-8 can be seen in side-channel attacks involving other physical parameters, such as, but not limited to, power or current. In some instances, a training procedure (e.g., using a training module) is used to collect N voltage measurement samples. In some instances, N samples are collected under controlled conditions. In some instances, a statistical summary comprising averages $\bar{V}$, standard deviations $\sigma(V)$, variance $\sigma^2(V)$, or a combination thereof are calculated from the N samples. In some instances, the calculated statistical summary is used to determine a buffer value for the alarm thresholds and warning thresholds. In some examples, the alarm thresholds, the warning thresholds, or both are determined empirically. In some examples, the alarm thresholds, the warning thresholds, or both are determined using a machine-learning approach described herein. In some examples, the machine learning approach is an SVM or NN.

In some instances, an upper alarm thresholds is equal to a sum of the average, standard deviation, and alarm threshold buffer (e.g., $\bar{V}+\sigma(V)+AB(V)$). In some instances, the lower alarm thresholds is equal to the negative sum of the average, standard deviation, and alarm threshold buffer (e.g., $\bar{V}-\sigma(V)-AB(V)$). In some instances, the upper and lower alarm thresholds for the velocity $\dot{V}$ is similarly calculated (e.g., $\bar{\dot{V}}+\sigma(\dot{V})+AB(\dot{V})$ and $\bar{\dot{V}}-\sigma(\dot{V})-AB(\dot{V})$, respectively). In some instances, the upper and lower alarm thresholds for the acceleration $\ddot{V}$ are similarly calculated (e.g., $\bar{\ddot{V}}+\sigma(\ddot{V})+AB(\ddot{V})$ and $\bar{\ddot{V}}-\sigma(\ddot{V})-AB(\ddot{V})$, respectively). In some instances, the upper warning thresholds are equal to a sum of the average, standard deviation, and warning threshold buffer (e.g., $\bar{V}+\sigma(V)+WB(V)$). In some instances, the lower warning thresholds are equal to the negative sum of the average, standard deviation, and warning threshold buffer (e.g., $\bar{V}-\sigma(V)-WB(V)$). In some instances, the upper and lower warning thresholds for the velocity $\dot{V}$ are similarly calculated (e.g., $\bar{\dot{V}}+\sigma(\dot{V})+AB(\dot{V})$ and $\bar{\dot{V}}-\sigma(\dot{V})-WB(\dot{V})$, respectively). In some instances, the upper and lower warning thresholds for the acceleration $\ddot{V}$ are similarly calculated (e.g., $\bar{\ddot{V}}+\sigma(\ddot{V})+WB(\ddot{V})$ and $\bar{\ddot{V}}-\sigma(\ddot{V})-WB(\ddot{V})$, respectively).

In some instances, addition of a payload (e.g., on a network) results in a drop in the voltage. In some instances, removal of a payload (e.g., on a network) results in a spike in the voltage. In some instances, during addition of a payload or during removal of a payload, the voltage stays within one or more thresholds. In some instances, no warning or alarm is triggered. In some instances, the voltage change corresponds to a given minimal slope of the first time derivative (e.g., velocity). In some examples, this given minimal slope is a static parameter. In some examples, this given minimal slope is a dynamic parameter. In some examples, this given minimal slope is a value. In some examples, the given minimal slope is a range. In some instances, the voltage corresponds to the minimal slope during addition or removal of a payload. In such instances, no warning, alarm, or a combination thereof is triggered. In some instances, the acceleration remains below or above a threshold depending on if the load is being added or removed, respectively. In some instances, the acceleration remains below or above the velocity threshold depending on if the load is being added or removed, respectively. In such instances, no warning, alarm, or a combination thereof is triggered.

Figure 6:
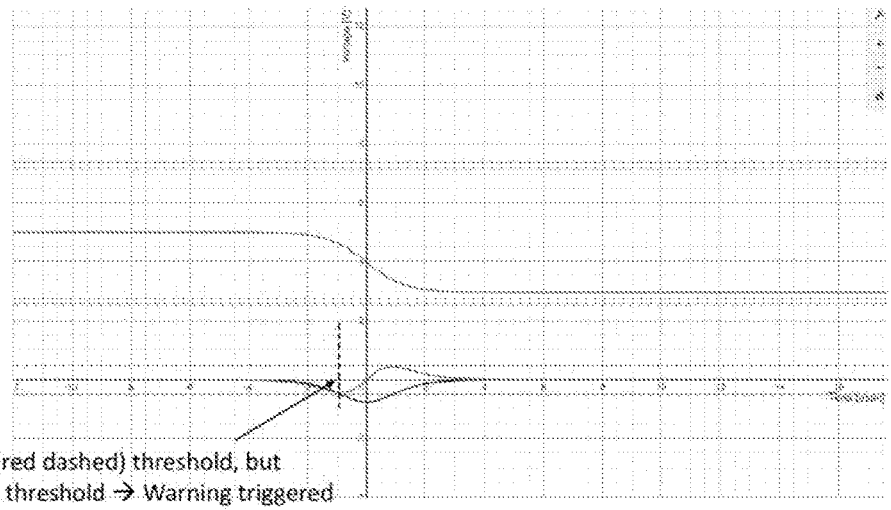
FIG. 6 shows a non-limiting example of an anormal voltage at addition of a load in a system.

In some instances, the voltage slope changes slow or fast. In some instances, the voltage slope changes slow or fast during a side-channel attack. In some instances, the voltage slope change is abnormally slow (FIG. 6). In some instances, the voltage remains within the warning threshold, the alarm threshold, or both. In some instances, the velocity of the voltage does not trigger a warning, alarm, or both, since the voltage remains within a warning threshold, alarm threshold, or both, respectively. However, in some instances, the acceleration drops below or spikes above its threshold, depending on if the payload is being added or removed, and a warning, alarm, or both is triggered.

Figure 7:
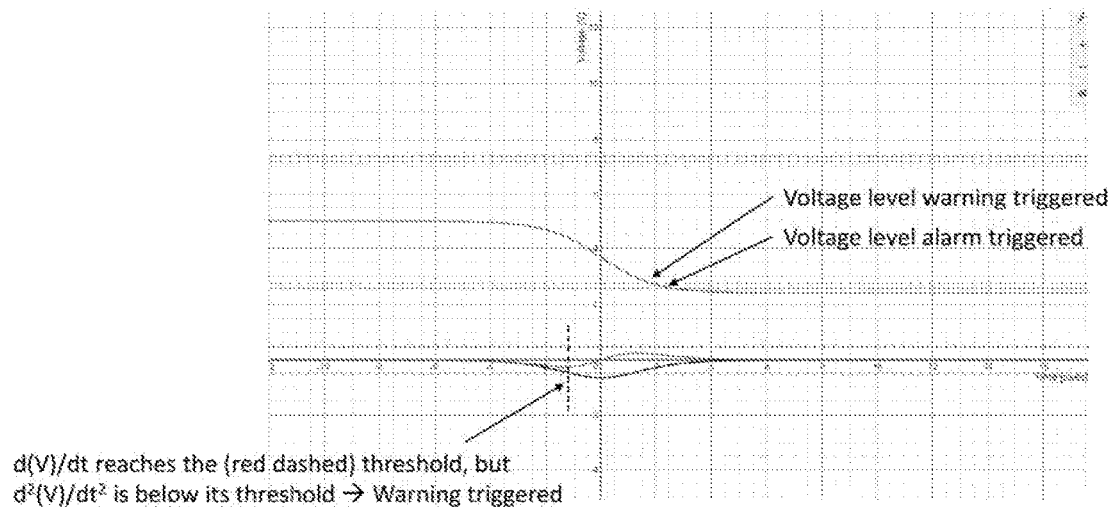
FIG. 7 shows a non-limiting example of a voltage anomaly at addition of a load in a system.

In some instances, the voltage slope changes slow or fast, and voltage does not remain within the warning threshold, the alarm threshold, or both (e.g., a voltage anomaly) (FIG. 7). In some instances, the voltage anomaly triggers a warning, alarm, or both. In some instances, the voltage anomaly does not trigger a warning, alarm, or both, in the velocity. In some instances, the voltage anomaly also triggers a warning, alarm, or both, in the velocity. In some instances, the voltage anomaly does not trigger a warning, alarm, or both, in the acceleration. In some instances, the voltage anomaly also triggers a warning, alarm, or both, in the acceleration.

Figure 8:
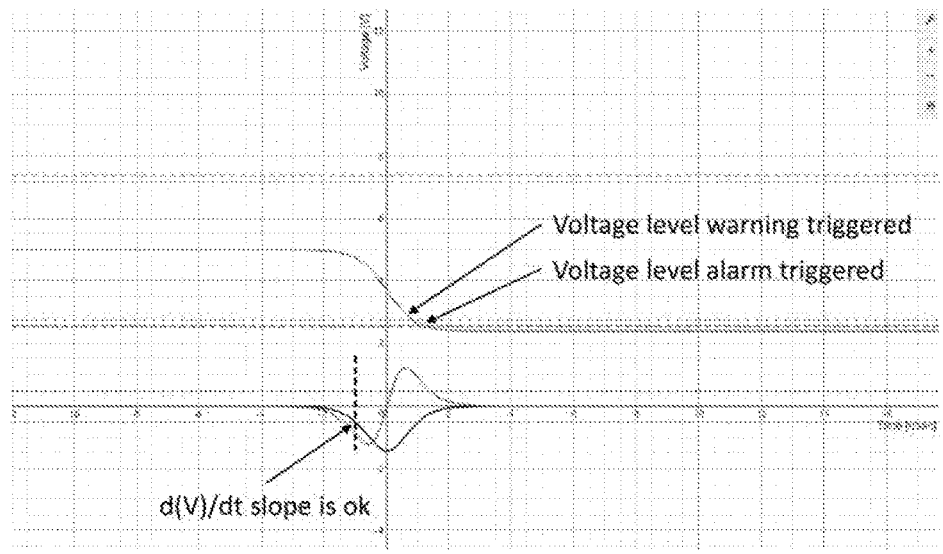
FIG. 8 shows a non-limiting example of a voltage anomaly in a system.

In some instances, the voltage slope remains in a normal range during addition or removal of a payload corresponding to a decrease or increase in voltage, respectively (FIG. 8). In some instances, since the voltage slope remains in a normal range, no warning, alarm, or both is triggered in the velocity and/or acceleration.

Figure 9:
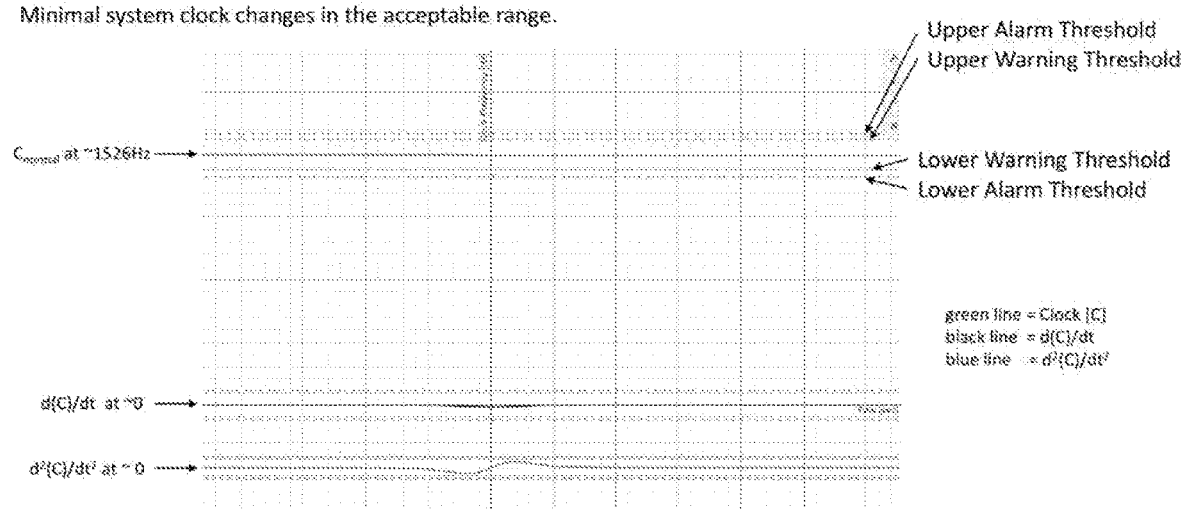
FIG. 9 shows a non-limiting example of a normal clock frequency in a system.
Figure 10:
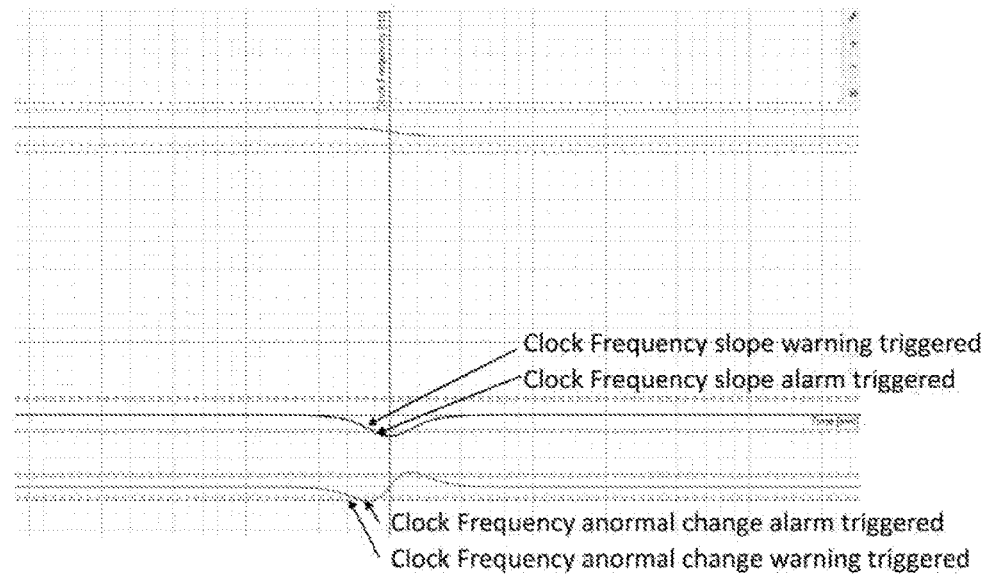
FIG. 10 shows a non-limiting example of an anormal clock frequency in a system.
Figure 11:
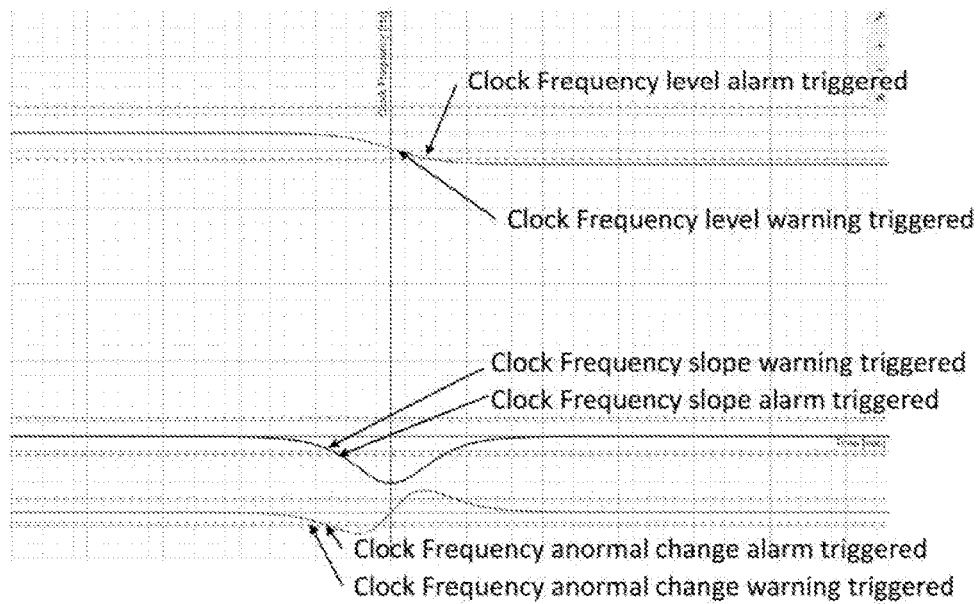
FIG. 11 shows a non-limiting example of an anomaly in a clock frequency in a system.

Exemplary diagrams of a system's internal clock frequency are provided in FIGS. 9-11 to illustrate a side-channel attack on clock frequency. In some instances, the internal clock frequency comprises the internal clock frequency of a CPU, a GPU, or any other processor. In some instances, the system's clock frequency can be measured using dedicated internal circuitry (e.g., measuring at 2× Nyquist), or a circuitry counting rising and/or falling slopes of a square-wave derived from the clock. In some instances, similar approaches as illustrated in FIGS. 9-11 can be seen in side-channel attacks involving a system's external clock frequency. In some instances, a training procedure (e.g., using a training module) is used to collect N clock frequency measurement samples. In some instances, N samples are collected under controlled conditions. In some instances, a statistical summary comprising averages $\bar{C}$, standard deviations $\sigma(C)$, variance $\sigma^2(C)$, or a combination thereof are calculated from the N samples. In some instances, the calculated statistical summary is used to determine a buffer value for the alarm thresholds and warning thresholds. In some examples, the alarm thresholds, the warning thresholds, or both are determined empirically. In some examples, the alarm thresholds, the warning thresholds, or both are determined using a machine-learning approach described herein. In some examples, the machine learning approach is an SVM or NN.

In some instances, an upper alarm thresholds is equal to a sum of the average, standard deviation, and alarm threshold buffer (e.g., $\bar{C}+\sigma(C)+AB(C)$). In some instances, the lower alarm thresholds is equal to the negative sum of the average, standard deviation, and alarm threshold buffer (e.g., $\bar{C}-\sigma(C)-AB(C)$). In some instances, the upper and lower alarm thresholds for the velocity $\dot{C}$ is similarly calculated (e.g., $\bar{\dot{C}}+\sigma(\dot{C})+AB(\dot{C})$ and $\bar{\dot{C}}-\sigma(\dot{C})-AB(\dot{C})$, respectively). In some instances, the upper and lower alarm thresholds for the acceleration $\ddot{C}$ are similarly calculated (e.g., $\bar{\ddot{C}}+\sigma(\ddot{C})$ and $\bar{\ddot{C}}-\sigma(\ddot{C})-AB(\ddot{C})$, respectively). In some instances, the upper warning thresholds are equal to a sum of the average, standard deviation, and warning threshold buffer (e.g., $\bar{C}+\sigma(C)+WB(C)$). In some instances, the lower warning thresholds are equal to the negative sum of the average, standard deviation, and warning threshold buffer (e.g., $\bar{C}-\sigma(C)-WB(C)$). In some instances, the upper and lower warning thresholds for the velocity $\dot{C}$ are similarly calculated (e.g., $\bar{\dot{C}}+\sigma(\dot{C})+AB(\dot{C})$ and $\bar{\dot{C}}-\sigma(\dot{C})-WB(\dot{C})$, respectively). In some instances, the upper and lower warning thresholds for the acceleration C are similarly calculated (e.g., $\bar{\ddot{C}}+\sigma(\ddot{C})$ $WB(\ddot{C})$ and $\bar{\ddot{C}}-\sigma(\ddot{C})-WB(\ddot{C})$, respectively).

In some instances, during a normal system clock frequency there is minimal system clock changes (FIG. 9). In such instances, the clock frequency stays within an acceptable ranges (e.g., within the thresholds). In some instances, during minimal system clock changes, the corresponding velocity, acceleration, or a combination thereof also remain steady with minimal changes.

In some instances, during a side-channel attack, an anormal change in the clock frequency occurs. In some instances, the anormal change comprises an unusually sudden change in the clock frequency (FIG. 10). In some examples, the clock frequency slightly increases or decreases but stays within an acceptable range. In some examples, the velocity drops below or spikes above one or more thresholds. In some examples, a warning, an alarm, or a combination thereof is triggered. In some examples, the acceleration also drops below or spikes above one or more thresholds. In some examples, a warning, an alarm, or a combination thereof is triggered. In some instances, the anormal change comprises an overall anomaly in the clock frequency (FIG. 11). In some examples, the clock frequency, the velocity, the acceleration, of any combination thereof drops below or spikes above one or more thresholds. In some examples, a warning, an alarm, or a combination thereof is triggered. In some examples, the clock frequency, the velocity, and the acceleration all drops below or spikes above one or more thresholds. In some examples, the warning and the alarm are triggered.

The systems of the present disclosure can comprise at least one processor and instructions executable by the at least one processor to provide an application for detecting a side-channel attack on a target in a network. In some instances, the application comprises a thresholding module. In some instances, the thresholding module is configured to perform operations comprising one or more of: collecting measurements of a physical parameter of the target over a period of time under controlled conditions; calculating, for each measurement, a first derivative and a second derivative relative to previous measurements; performing parameter normalization with respect to the measurements, the first derivatives, and the second derivatives; generating a raw dataset comprising the normalized measurements, first derivatives, and second derivatives; calculating a statistical summary of the raw dataset; and applying a machine learning model to the statistical summary to determine a threshold for the physical parameter of the target. In some examples, the machine learning model comprises a classical ML method and/or a deep learning method, such as those described herein.

In some instances, the application comprises a detection module. In some instances, the detection module is configured to perform operations comprising one or more of: monitoring the physical parameter of the target; and comparing the physical parameter to the threshold to detect an anomaly in real-time. In some instances, the detection module comprises one or more machine learning approaches (e.g., classical ML method, such as an SVM, or deep learning method, such as a NN) described herein. In some examples, monitoring the physical parameter of the target and comparing the physical parameter to the threshold to detect an anomaly in real-time are performed using the same machine learning approach. In some examples, monitoring the physical parameter of the target and comparing the physical parameter to the threshold to detect an anomaly in real-time are performed using different machine learning approaches.

In some instances, the thresholding module, the detection module, or both are implemented on an edge device in the network. In some instances, the thresholding module, the detection module, or both are implemented at the target in the network. In some instances, implementing the thresholding module, the detection module, or both on an edge device or the target allows for real-time detection of anomalies in the system. In some instances, this can allow for changing the threshold based on an anomaly detected in real-time to achieve adaptive thresholding. In some instances, this can further allow for preventing an anomaly in the physical parameter in real-time. In some examples, preventing the anomaly comprises one or more of: sending a notification, quiescing a clock, or preventing booting or rebooting. In some instances, implementing the thresholding module, the detection module, or both on an edge device or the target allows for predicting an anomaly in the physical parameter in real-time.

The systems described herein for detecting a side-channel attack on a target in a network can further comprises a memory; at least one first processor communicatively coupled to the network; and at least one second processor communicatively coupled to the network. In some instances, the at least one first processor is configured to perform the training operation, the detection operation, or both, as described herein. In some examples, the at least one first processor is located on an edge device in the network. In some examples, the at least one first processor is located on a target in the network, such as those described herein. In some instances, the at least one second processor is configured to perform the training operation, the detection operation, or both, as described herein. In some examples, the at least one second processor is located on an edge device in the network. In some examples, the at least one second processor is located on a target in the network, such as those described herein.

In some instances, the at least one first processor communicatively coupled to the network and configured to perform operations comprising: collecting training measurements of a physical parameter of the target over a period of time under controlled conditions and storing the training measurements in the memory; and monitoring the physical parameter of the target in real-time and storing the real-time measurements in the memory. In some instances, the at least one second processor communicatively coupled to the network and configured to perform operations comprising: accessing the training measurements of the physical parameter of the target; calculating, for each training measurement, a first derivative and a second derivative relative to previous measurements; performing parameter normalization with respect to the training measurements, the first derivatives, and the second derivatives; generating a raw dataset comprising the normalized measurements, first derivatives, and second derivatives; calculating a statistical summary of the raw dataset; applying a machine learning model to the statistical summary to determine a threshold for the physical parameter of the target; accessing the real-time measurements to monitor the physical parameter of the target; and comparing the physical parameter to the threshold to detect an anomaly in real-time.

In alternative instances, the at least one first processor communicatively coupled to the network and configured to perform operations comprising: collecting training measurements of a physical parameter of the target over a period of time under controlled conditions and storing the training measurements in the memory; calculating, for each training measurement, a first derivative and a second derivative relative to previous measurements; performing parameter normalization with respect to the training measurements, the first derivatives, and the second derivatives; generating a raw dataset comprising the normalized measurements, first derivatives, and second derivatives; calculating a statistical summary of the raw dataset; applying a machine learning model to the statistical summary to determine a threshold for the physical parameter of the target; and monitoring the physical parameter of the target in real-time and storing the real-time measurements in the memory. In some instances, the at least one second processor communicatively coupled to the network and configured to perform operations comprising: accessing the real-time measurements to monitor the physical parameter of the target; and comparing the physical parameter to the threshold to detect an anomaly in real-time.

Computing System

Figure 12:
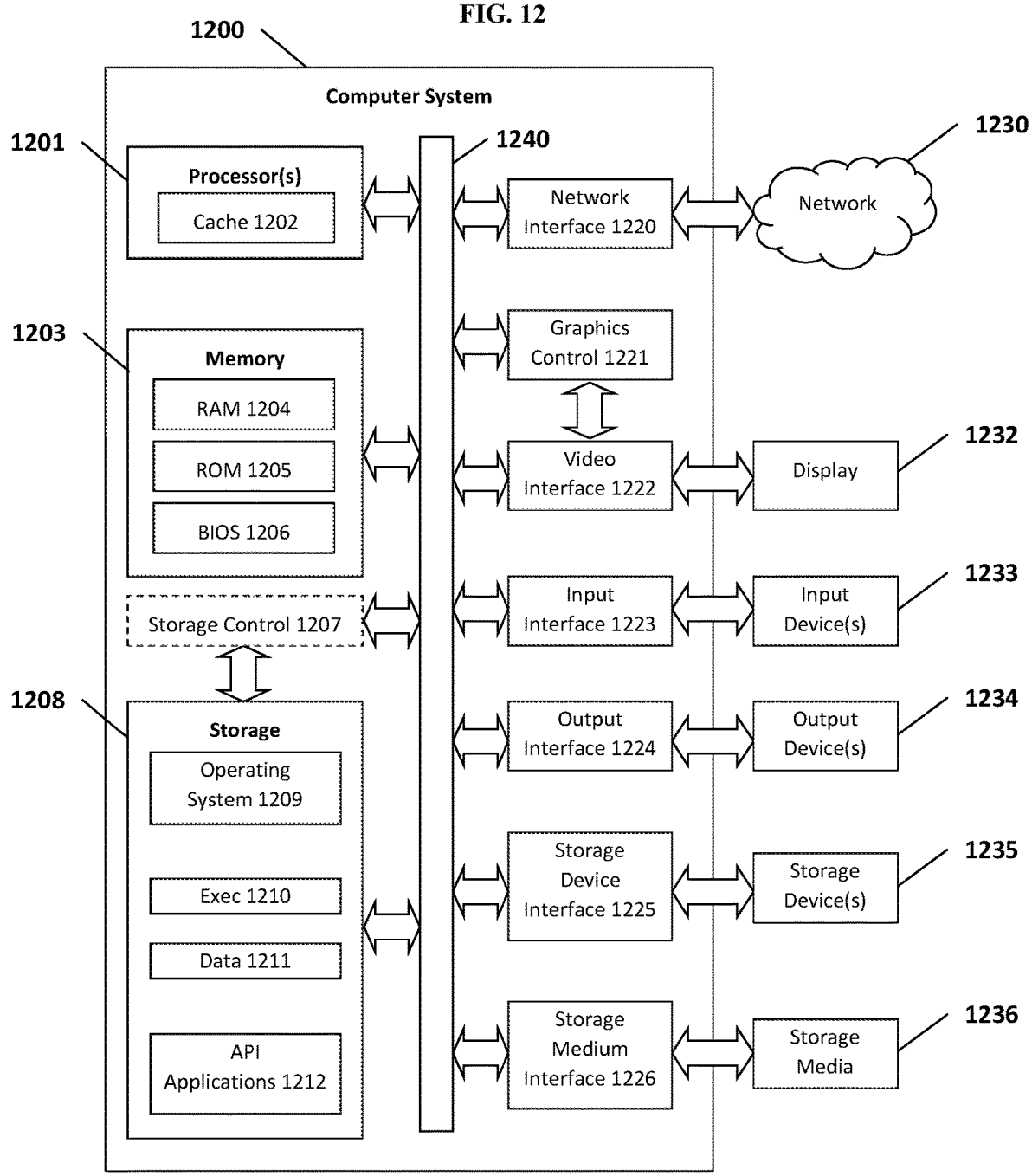
FIG. 12 shows a non-limiting example of a computing device; in this case, a device with one or more processors, memory, storage, and a network interface.

Referring to FIG. 12, a block diagram is shown depicting an exemplary machine that includes a computer system 1200 (e.g., a processing or computing system) within which a set of instructions can execute for causing a device to perform or execute any one or more of the aspects and/or methodologies for static code scheduling of the present disclosure. The components in FIG. 12 are examples only and do not limit the scope of use or functionality of any hardware, software, embedded logic component, or a combination of two or more such components implementing particular embodiments.

Computer system 1200 may include one or more processors 1201, a memory 1203, and a storage 1208 that communicate with each other, and with other components, via a bus 1240. The bus 1240 may also link a display 1232, one or more input devices 1233 (which may, for example, include a keypad, a keyboard, a mouse, a stylus, etc.), one or more output devices 1234, one or more storage devices 1235, and various tangible storage media 1236. All of these elements may interface directly or via one or more interfaces or adaptors to the bus 1240. For instance, the various tangible storage media 1236 can interface with the bus 1240 via storage medium interface 1226. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 1200 includes one or more processor(s) 1201 (e.g., central processing units (CPUs), general purpose graphics processing units (GPGPUs), or quantum processing units (QPUs)) that carry out functions. Processor(s) 1201 optionally contains a cache memory unit 1202 for temporary local storage of instructions, data, or computer addresses.

Processor(s) 1201 are configured to assist in execution of computer readable instructions. Computer system 1200 may provide functionality for the components depicted in FIG. 12 as a result of the processor(s) 1201 executing non-transitory, processor-executable instructions embodied in one or more tangible computer-readable storage media, such as memory 1203, storage 1208, storage devices 1235, and/or storage medium 1236. The computer-readable media may store software that implements particular embodiments, and processor(s) 1201 may execute the software. Memory 1203 may read the software from one or more other computer-readable media (such as mass storage device(s) 1235, 1236) or from one or more other sources through a suitable interface, such as network interface 1220. The software may cause processor(s) 1201 to carry out one or more processes or one or more steps of one or more processes described or illustrated herein. Carrying out such processes or steps may include defining data structures stored in memory 1203 and modifying the data structures as directed by the software.

The memory 1203 may include various components (e.g., machine readable media) including, but not limited to, a random access memory component (e.g., RAM 1204) (e.g., static RAM (SRAM), dynamic RAM (DRAM), ferroelectric random access memory (FRAM), phase-change random access memory (PRAM), etc.), a read-only memory component (e.g., ROM 1205), and any combinations thereof. ROM 1205 may act to communicate data and instructions unidirectionally to processor(s) 1201, and RAM 1204 may act to communicate data and instructions bidirectionally with processor(s) 1201. ROM 1205 and RAM 1204 may include any suitable tangible computer-readable media described below. In one example, a basic input/output system 1206 (BIOS), including basic routines that help to transfer information between elements within computer system 1200, such as during start-up, may be stored in the memory 1203.

Fixed storage 1208 is connected bidirectionally to processor(s) 1201, optionally through storage control unit 107. Fixed storage 108 provides additional data storage capacity and may also include any suitable tangible computer-readable media described herein. Storage 1208 may be used to store operating system 1209, executable(s) 1210, data 1211, applications 1212 (application programs), and the like. Storage 1208 can also include an optical disk drive, a solid-state memory device (e.g., flash-based systems), or a combination of any of the above. Information in storage 1208 may, in appropriate cases, be incorporated as virtual memory in memory 1203.

In one example, storage device(s) 1235 may be removably interfaced with computer system 100 (e.g., via an external port connector (not shown)) via a storage device interface 1225. Particularly, storage device(s) 1235 and an associated machine-readable medium may provide non-volatile and/or volatile storage of machine-readable instructions, data structures, program modules, and/or other data for the computer system 1200. In one example, software may reside, completely or partially, within a machine-readable medium on storage device(s) 1235. In another example, software may reside, completely or partially, within processor(s) 1201.

Bus 140 connects a wide variety of subsystems. Herein, reference to a bus may encompass one or more digital signal lines serving a common function, where appropriate. Bus 1240 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1200 may also include an input device 1233. In one example, a user of computer system 1200 may enter commands and/or other information into computer system 1200 via input device(s) 1233. Examples of an input device(s) 1233 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 1233 may be interfaced to bus 1240 via any of a variety of input interfaces 1223 (e.g., input interface 1223) including, but not limited to, serial, parallel, game port, USB, FIREWIRE, THUNDERBOLT, or any combination of the above.

In particular embodiments, when computer system 1200 is connected to network 1230, computer system 1200 may communicate with other devices, specifically mobile devices and enterprise systems, distributed computing systems, cloud storage systems, cloud computing systems, and the like, connected to network 1230. Communications to and from computer system 1200 may be sent through network interface 1220. For example, network interface 1220 may receive incoming communications (such as requests or responses from other devices) in the form of one or more packets (such as Internet Protocol (IP) packets) from network 1230, and computer system 1200 may store the incoming communications in memory 1203 for processing. Computer system 1200 may similarly store outgoing communications (such as requests or responses to other devices) in the form of one or more packets in memory 1203 and communicated to network 1230 from network interface 1220. Processor(s) 1201 may access these communication packets stored in memory 1203 for processing.

Examples of the network interface 1220 include, but are not limited to, a network interface card, a modem, and any combination thereof. Examples of a network 1230 or network segment 1230 include, but are not limited to, a distributed computing system, a cloud computing system, a wide area network (WAN) (e.g., the Internet, an enterprise network), a local area network (LAN) (e.g., a network associated with an office, a building, a campus, or other relatively small geographic space), a telephone network, a direct connection between two computing devices, a peer-to-peer network, and any combinations thereof. A network, such as network 1230, may employ a wired and/or a wireless mode of communication. In general, any network topology may be used.

Information and data can be displayed through a display 1232. Examples of a display 1232 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 1232 can interface to the processor(s) 1201, memory 12203, and fixed storage 1208, as well as other devices, such as input device(s) 1233, via the bus 1240. The display 1232 is linked to the bus 1240 via a video interface 1222, and transport of data between the display 1232 and the bus 1240 can be controlled via the graphics control 1221. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 1232, computer system 1200 may include one or more other peripheral output devices 1234 including, but not limited to, an audio speaker, a printer, a storage device, and any combinations thereof. Such peripheral output devices may be connected to the bus 1240 via an output interface 1224. Examples of an output interface 1224 include, but are not limited to, a serial port, a parallel connection, a USB port, a FIREWIRE port, a THUNDERBOLT port, and any combinations thereof.

In addition or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, handheld computers, Internet appliances, mobile smartphones, and tablet computers. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

The term "side-channel attack" as used herein generally refers to a security exploit where information is gained from the implementation of a computer system, rather than a weaknesses in the implemented algorithms (e.g., software bugs). Such implementation can comprise, but is not limited to measuring or exploiting indirect effects of the system or its hardware to gain information from and/or influence the program execution of a system.

The term "machine learning" as used herein generally refers to a one or more computer programs or algorithms that improves one or more performance metrics with experience. The performance metric can comprise, but is not limited to accuracy, efficiency, log-loss, area under the curve (AOC), confusion matrix, etc. The experience can comprise, but is not limited to exposure to more data or a prolonged training period. In machine learning, training data and new data can lie on the same space. As a result, new data provided to a machine learning system can be expected to belong to one of the clusters from the training data (e.g., lie on the same subspace that the training data spanned). If perturbations push data from one cluster to another (or somewhere along the subspace), then the models of the machine learning system can generate accurate predictions. However, when perturbations push data outside of this subspace, the machine learning models can generate inaccurate predictions.

EXAMPLES

Example 1—Side-Channel Attack on Temperature

Alarm thresholds and warning thresholds for a side-channel attack on temperature were calculated using a training procedure, such as the training module described herein, under controlled conditions to collect measurement samples. The temperature measurements T were measured using an integrated circuitry and/or a dedicated sensor, such as Adafruit BME280. From the samples, averages $\bar{T}$ and standard deviations $\sigma(T)$ were calculated. The calculated averages and standard deviations were used to determine a buffer value for the alarm thresholds AB(T). The buffer value was determined using a machine-learning approach, such as an SVM or NN, during the learning procedure, although it can also be determined empirically. Buffer values for the warning thresholds WB(T) were also determined using a machine learning approach during the learning procedure. However, the warning thresholds can also be determined empirically.

The upper alarm thresholds was equal to a sum of the average, standard deviation, and alarm threshold buffer (e.g., $\bar{T}+\sigma(T)+AB(T)$). The lower alarm thresholds was equal to the negative sum of the average, standard deviation, and alarm threshold buffer (e.g., $\bar{T}-\sigma(T)-AB(T)$). The upper and lower alarm thresholds for the velocity $\dot{T}$ were similarly calculated (e.g., $\bar{\dot{T}}+\sigma(\dot{T})+AB(\dot{T})$ and $\bar{\dot{T}}-\sigma(\dot{T})-AB(\dot{T})$, respectively). The upper and lower alarm thresholds for the acceleration $\ddot{T}$ were similarly calculated (e.g., $\bar{\ddot{T}}+\sigma(\ddot{T})+AB(\ddot{T})$ and $\bar{\ddot{T}}-\sigma(\ddot{T})-AB(\ddot{T})$, respectively).

The upper warning thresholds was equal to a sum of the average, standard deviation, and warning threshold buffer (e.g., $\bar{T}+\sigma(T)+WB(T)$). The lower warning thresholds was equal to the negative sum of the average, standard deviation, and warning threshold buffer (e.g., $\bar{T}-\sigma(T)-WB(T)$). The upper and lower warning thresholds for the velocity $\dot{T}$ were similarly calculated (e.g., $\bar{\dot{T}}+\sigma(\dot{T})+AB(\dot{T})$ and $\bar{\dot{T}}-\sigma(\dot{T})-WB(\dot{T})$, respectively). The upper and lower warning thresholds for the acceleration $\ddot{T}$ were similarly calculated (e.g., $\bar{\ddot{T}}+\sigma(\ddot{T})+WB(\ddot{T})$ and $\bar{\ddot{T}}-\sigma(\ddot{T})-WB(\ddot{T})$, respectively).

As shown in FIG. 1, during normal temperature increase, for example, due to a change from night to day, the temperature remained in a normal range within the upper warning and lower warning thresholds. The velocity and acceleration of the temperature measurements also remained within the thresholds. Further, as shown in FIG. 2, during normal temperature decrease, for example, due to a change from day to night, the temperature remained in a normal range within the upper warning and lower warning thresholds. The velocity and acceleration of the temperature measurements also remained within the thresholds.

However, during a side-channel attack, the temperature measurements increased abnormally slow (FIG. 3). As shown in FIG. 3, the temperature measurement increased to a level surpassing both the warning threshold and alarm threshold. As such, first the warning and then the alarm was triggered.

The temperature measurements also increased abnormally fast during a side-channel attack (FIG. 4). As shown in FIG. 4, the temperature measurement increased to a level surpassing both the warning threshold and alarm threshold. As such, first the warning and then the alarm was triggered. Further, the velocity also increased due to the sudden change in temperature. This resulted in the temperature slope warning and alarm being triggered. Finally, the acceleration also increased due to the sudden change in temperature. This resulted in a temperature warning and alarm being triggered due to the anormal change.

Example 2—Side-Channel Attack on System Voltage

Alarm thresholds and warning thresholds for a side-channel attack on supply voltage were calculated using a training procedure, such as the training module described herein, under controlled conditions to collect measurement samples. The supply voltage measurements V were measured using a integrated circuitry and/or a dedicated sensor, such as Adafruit INA260. From the samples, averages $\bar{V}$ and standard deviations $\sigma(V)$ were calculated. The calculated averages and standard deviations were used to determine a buffer value for the alarm thresholds AB(V). The buffer value was determined using a machine-learning approach, such as an SVM or NN, during the learning procedure, although it can also be determined empirically. Buffer values for the warning thresholds WB(V) were also determined using a machine learning approach during the learning procedure. However, the warning thresholds can also be determined empirically.

The upper alarm thresholds was equal to a sum of the average, standard deviation, and alarm threshold buffer (e.g., $\bar{V}+\sigma(V)+AB(V)$). The lower alarm thresholds was equal to the negative sum of the average, standard deviation, and alarm threshold buffer (e.g., $\bar{V}-\sigma(V)-AB(V)$). The upper and lower alarm thresholds for the velocity $\dot{V}$ were similarly calculated (e.g., $\bar{\dot{V}}+\sigma(\dot{V})+AB(\dot{V})$ and $\bar{\dot{V}}-\sigma(\dot{V})-AB(\dot{V})$, respectively). The upper and lower alarm thresholds for the acceleration $\ddot{V}$ were similarly calculated (e.g., $\bar{\ddot{V}}+\sigma(\ddot{V})+AB(\ddot{V})$ and $\bar{\ddot{V}}-\sigma(\ddot{V})-AB(\ddot{V})$, respectively).

The upper warning thresholds was equal to a sum of the average, standard deviation, and warning threshold buffer (e.g., $\bar{V}+\sigma(V)+WB(V)$). The lower warning thresholds was equal to the negative sum of the average, standard deviation, and warning threshold buffer (e.g., $\bar{V}-\sigma(V)-WB(V)$). The upper and lower warning thresholds for the velocity $\dot{V}$ were similarly calculated (e.g., $\bar{\dot{V}}+\sigma(\dot{V})+AB(\dot{V})$ and $\bar{\dot{V}}-\sigma(\dot{V})-WB(\dot{V})$, respectively). The upper and lower warning thresholds for the acceleration $\ddot{V}$ were similarly calculated (e.g., $\overline{\ddot{V}}+\sigma(\ddot{V})+WB(\ddot{V})$ and $\overline{\ddot{V}}-\sigma(\ddot{V})-WB(\ddot{V})$, respectively).

Figure 5:
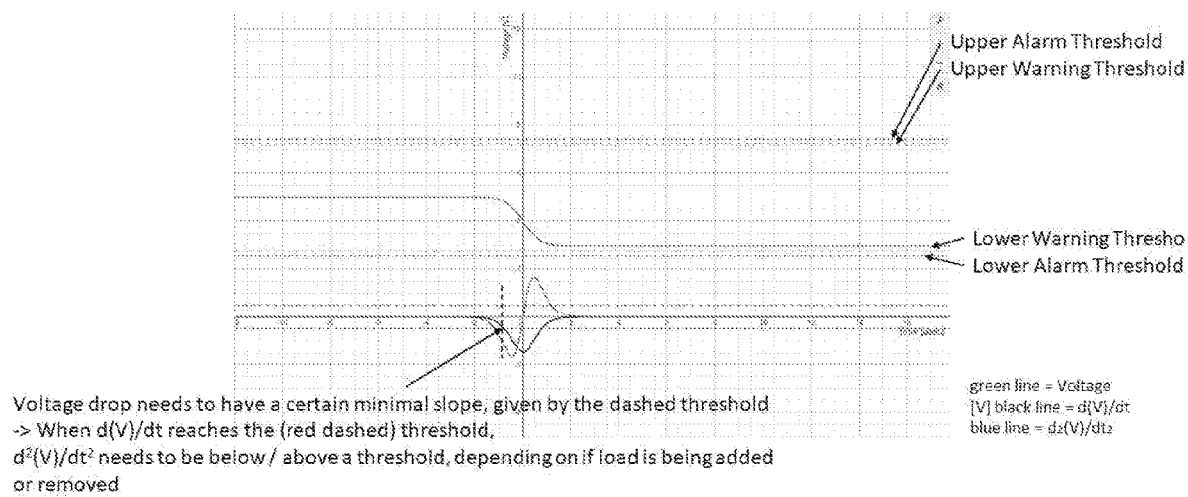
FIG. 5 shows a non-limiting example of a normal voltage at addition of a load in a system.

As shown in FIG. 5, during addition of a payload in the network, a normal slight voltage drop occurs. The voltage stays within warning threshold and no warning or alarms are triggered. Further, in the absence of a side-channel attack, the voltage drop corresponds with a given minimal slope, which is indicated by the vertical dashed line in FIG. 5. As shown, the slope corresponding to the velocity did not trigger a response since it reached the threshold within the vertical line. Additionally, the corresponding acceleration should remain below or above the threshold depending on if the load is being added or removed, respectively. In FIG. 5, the load was being added and the acceleration was below the threshold, and as such, no response was triggered.

During a side-channel attack, a glitch in the voltage was triggered which caused an anormal slow slope during addition of a load (FIG. 6). As shown in FIG. 6, the voltage change did not trigger a response, and neither did the velocity of the voltage. However, the acceleration was not below the threshold (intersection between vertical dotted line and horizontal dotted line at coordinates (−1.0, −0.5)). As such, a warning in the system was triggered.

Another slow slope in the voltage was triggered during addition of a load by voltage anomaly during a side-channel attack (FIG. 7). The voltage anomaly decreased the voltage in FIG. 7, where the warning and alarm were both triggered. As shown, the velocity reached the threshold as remained within an acceptable slope range, however, the acceleration was not below the threshold (as discussed in FIG. 6), and the warning was triggered.

Finally, a side-channel attack caused a voltage anomaly but with a normal sharp slope, as shown in FIG. 8. Although the slope of the velocity and the acceleration remain in an acceptable range, the voltage measurement itself dropped below the thresholds, and a warning, as well as an alarm was triggered.

Example 3—Side-Channel Attack on Internal Clock Frequency

Alarm thresholds and warning thresholds for a side-channel attack on internal clock frequency were calculated using a training procedure, such as the training module described herein, under controlled conditions to collect measurement samples. The internal clock frequency measurements C were measured using an integrated circuitry, and/or a circuitry counting rising and/or falling slopes of a square-wave derived from the clock. From the samples, averages $\overline{C}$ and standard deviations $\sigma(C)$ were calculated. The calculated averages and standard deviations were used to determine a buffer value for the alarm thresholds AB(C). The buffer value was determined using a machine-learning approach, such as an SVM or NN, during the learning procedure, although it can also be determined empirically. Buffer values for the warning thresholds WB(C) were also determined using a machine learning approach during the learning procedure. However, the warning thresholds can also be determined empirically.

The upper alarm thresholds was equal to a sum of the average, standard deviation, and alarm threshold buffer (e.g., $\overline{C}+\sigma(C)+AB(C)$). The lower alarm thresholds was equal to the negative sum of the average, standard deviation, and alarm threshold buffer (e.g., $\overline{C}-\sigma(C)-AB(C)$). The upper and lower alarm thresholds for the velocity $\dot{C}$ were similarly calculated (e.g., $\overline{\dot{C}}+\sigma(\dot{C})+AB(\dot{C})$ and $\overline{\dot{C}}-\sigma(\dot{C})-AB(\dot{C})$, respectively). The upper and lower alarm thresholds for the acceleration $\ddot{C}$ were similarly calculated (e.g., $\overline{\ddot{C}}+\sigma(\ddot{C})+AB(\ddot{C})$ and $\overline{\ddot{C}}-\sigma(\ddot{C})-AB(\ddot{C})$, respectively).

The upper warning thresholds was equal to a sum of the average, standard deviation, and warning threshold buffer (e.g., $\overline{C}+\sigma(C)+WB(C)$). The lower warning thresholds was equal to the negative sum of the average, standard deviation, and warning threshold buffer (e.g., $\overline{C}-\sigma(C)-WB(C)$). The upper and lower warning thresholds for the velocity $\dot{C}$ were similarly calculated (e.g., $\overline{\dot{C}}+\sigma(\dot{C})+AB(\dot{C})$ and $\overline{\dot{C}}-\sigma(\dot{C})-WB(\dot{C})$, respectively). The upper and lower warning thresholds for the acceleration $\ddot{C}$ were similarly calculated (e.g., $\overline{\ddot{C}}+\sigma(\ddot{C})+WB(\ddot{C})$ and $\overline{\ddot{C}}-\sigma(\ddot{C})-WB(\ddot{C})$, respectively).

During a normal system clock frequency, there was minimal system clock changes that stayed within the acceptable ranges (FIG. 9). The clock frequency remained at ~1256 Hz, and the velocity and acceleration remained ~0.

During a side-channel attack, an anormal change in the clock frequency in the form of an unusually sudden change in the clock frequency occurred (FIG. 10). Here, the clock frequency slightly decreased but stayed within an acceptable range. However, the velocity dropped below thresholds, and the warning and the alarm for the velocity was triggered. Further, the acceleration also dropped below the thresholds, and the warning and the alarm for the acceleration was also triggered.

During a side-channel attack, an anormal change in the clock frequency in the form of an overall anomaly in the clock frequency occurred (FIG. 11). Here, the clock frequency, the velocity, and the acceleration all dropped below the acceptable thresholds, and the warning, as well as the alarm was triggered for all three physical metrics.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method of detecting a side-channel attack on a target in a network comprising:
   a) conducting, by an application in the network, a training operation comprising:
      i) collecting measurements of a physical parameter of the target under controlled conditions, wherein the physical parameter comprises one or more of a temperature, a voltage, a current, a clock frequency, or a clock duty;
      ii) calculating, for each measurement, a first order derivative and a second order derivative relative to previous measurements;
      iii) calculating a statistical summary of a raw dataset comprising the measurements, the first order derivatives, and the second order derivatives, wherein the statistical summary comprises averages and standard deviations of the measurements, the first order derivatives, and the second order derivatives; and
      iv) training a machine learning model based at least in part on the statistical summary to determine a threshold for the physical parameter of the target, wherein the threshold comprises one or more of an upper alarm threshold or a lower alarm threshold, and wherein the threshold comprises one or more of a magnitude, a velocity, and an acceleration of the physical parameter; and
b) conducting, by an edge device located at the target, a detection operation comprising:
   i) monitoring the physical parameter of the target to obtain a measurement
   ii) comparing the measurement of the physical parameter to the threshold;
   iii) detecting an anomaly associated with the physical parameter in real-time when the measurement of the physical parameter is not within one or more of the upper alarm threshold or the lower alarm threshold and
   iv) preventing booting or rebooting of the target or quiescing a clock in response to detecting the anomaly.

2. The method of claim 1, wherein the temperature comprises a system temperature of the target or a processor temperature of the target.

3. The method of claim 1, wherein the voltage physical parameter comprises a supply voltage of the target or a part of the target.

4. The method of claim 1, wherein the current comprises a current of the target or a part of the target.

5. The method of claim 1, wherein the threshold further comprises one or more of an upper warning threshold or a lower warning threshold.

6. The method of claim 1, wherein the machine learning model comprises a neural network (NN).

7. The method of claim 6, wherein the machine learning model comprises a deep neural network (DNN).

8. The method of claim 7, wherein the machine learning model comprises a convolutional neural network (CNN).

9. The method of claim 8, wherein the machine learning model comprises a one-class CNN.

10. The method of claim 7, wherein the machine learning model comprises a recurrent neural network (RNN).

11. The method of claim 7, wherein the machine learning model comprises a graph neural network (GNN).

12. The method of claim 7, wherein the machine learning model comprises a convolutional graph neural network (CGNN).

13. The method of claim 1, wherein the machine learning model comprises a transformer.

14. The method of claim 1, wherein training the machine learning model is performed at the edge device.

15. The method of claim 14, wherein the machine learning model comprises a support-vector machine (SVM).

16. The method of claim 15, wherein the machine learning model comprises a one-class SVM.

17. The method of claim 14, wherein the machine learning model comprises a k-nearest neighbor (KNN) algorithm.

18. The method of claim 14, wherein the machine learning model comprises an isolation forest algorithm.

19. The method of claim 1, further comprising training the machine learning model based at least in part on the raw data set.

20. The method of claim 19, wherein the machine learning model comprises: a neural network (NN), a transformer, support-vector machine (SVM), a k-nearest neighbor (KNN) algorithm, or an isolation forest algorithm.

21. The method of claim 1, further comprising changing the threshold based on the anomaly detected in real-time.

22. The method of claim 1, further comprising sending a notification in response to detecting the anomaly.

23. The method of claim 1, further comprising predicting the anomaly in the physical parameter in real-time.

24. A computer-implemented system comprising: at least one hardware processor and instructions executable by the at least one processor that causes the system to provide an application for detecting a side-channel attack on a target in a network, the application comprising:
a) a thresholding module configured to perform operations comprising:
   i) collecting measurements of a physical parameter of the target under controlled conditions, wherein the physical parameter comprises one or more of a temperature, a voltage, a current, a clock frequency, or a clock duty;
   ii) calculating, for each measurement, a first order derivative and a second order derivative relative to previous measurements;
   iii) calculating a statistical summary of a raw dataset comprising the measurements, the first order derivatives, and the second order derivatives, wherein the statistical summary comprises averages and standard deviations of the measurements, the first order derivatives, and the second order derivatives; and
   iv) training a machine learning model based at least in part on the statistical summary to determine a threshold for the physical parameter of the target, wherein the threshold comprises one or more of an upper alarm threshold or a lower alarm threshold, and wherein the threshold comprises one or more of a magnitude, a velocity, and an acceleration of the physical parameter; and
b) a detection module configured to perform operations comprising:
   i) monitoring the physical parameter of the target to obtain a measurement;
   ii) comparing the measurement of the physical parameter to the threshold;
   iii) detecting an anomaly associated with the physical parameter in real-time when the measurement of the physical parameter is not within one or more of the upper alarm threshold or the lower alarm threshold; and
   iv) preventing booting or rebooting of the target or quiescing a clock in response to detecting the anomaly.

25. The system of claim 24, wherein one or more of: the thresholding module and the detection module are implemented at an edge device in the network.

26. The system of claim 24, wherein one or more of: the thresholding module and the detection module are implemented at the target in the network.

27. The system of claim 24, wherein the thresholding module is configured to further perform an operation comprising changing the threshold based on the anomaly detected in real-time.

28. The system of claim 24, wherein the machine learning model comprises a neural network (NN), a transformer, support-vector machine (SVM), a k-nearest neighbor (KNN) algorithm, or an isolation forest algorithm.

29. A computer-implemented system for detecting a side-channel attack on a target in a network comprising:
a) a memory communicatively coupled to the network;
b) at least one first processor communicatively coupled to the network and configured to perform operations comprising:
   i) collecting training measurements of a physical parameter of the target under controlled conditions and storing the training measurements in the memory, wherein the physical parameter comprises one or more of a temperature, a voltage, a current, a clock frequency, and a clock duty; and
ii) monitoring the physical parameter of the target in real-time and storing the real-time measurements in the memory; and
c) at least one second processor communicatively coupled to the network and configured to perform operations comprising:
i) accessing the training measurements of the physical parameter of the target;
ii) calculating, for each training measurement, a first order derivative and a second order derivative relative to previous measurements;
iii) calculating a statistical summary of a raw dataset comprising the measurements, the first order derivatives, and the second order derivatives, wherein the statistical summary comprises averages and standard deviations of the measurements, the first order derivatives, and the second order derivatives;
iv) training a machine learning model based at least in part on the statistical summary to determine a threshold for the physical parameter of the target, wherein the threshold comprises one or more of an upper alarm threshold or a lower alarm threshold, and wherein the threshold comprises one or more of a magnitude, a velocity, and an acceleration of the physical parameter;
v) accessing the real-time measurements to monitor the physical parameter of the target;
vi) comparing the measurement of the physical parameter to the threshold;
vii) detecting an anomaly associated with the physical parameter in real-time when the measurement of the physical parameter is not within one or more of the upper alarm threshold or the lower alarm threshold; and
viii) preventing booting or rebooting of the target or quiescing a clock in response to detecting the anomaly.

30. The system of claim 29, wherein the at least second processor is configured to further perform an operation comprising changing the threshold based on the anomaly detected in real-time.

31. The system of claim 29, wherein the machine learning model comprises a neural network (NN), a transformer, support-vector machine (SVM), a k-nearest neighbor (KNN) algorithm, or an isolation forest algorithm.

32. A computer-implemented system for detecting a side-channel attack on a target in a network comprising:
a) a memory communicatively coupled to the network;
b) at least one first processor communicatively coupled to the network and configured to perform operations comprising:
i) collecting training measurements of a physical parameter of the target under controlled conditions and storing the training measurements in the memory, wherein the physical parameter comprises one or more of a temperature, a voltage, a current, a clock frequency, and a clock duty;
ii) calculating, for each training measurement, a first order derivative and a second order derivative relative to previous measurements;
iii) calculating a statistical summary of a raw dataset comprising the measurements, the first order derivatives, and the second order derivatives, wherein the statistical summary comprises averages and standard deviations of the measurements, the first order derivatives, and the second order derivatives;
iv) training machine learning model based at least in part on the statistical summary to determine a threshold for the physical parameter of the target, wherein the threshold comprises one or more of an upper alarm threshold or a lower alarm threshold, and wherein the threshold comprises one or more of a magnitude, a velocity, and an acceleration of the physical parameter; and
vii) monitoring the physical parameter of the target in real-time and storing the real-time measurements in the memory; and
c) at least one second processor communicatively coupled to the network and configured to perform operations comprising:
i) accessing the real-time measurements to monitor the physical parameter of the target;
ii) comparing the measurement of the physical parameter to the threshold;
iii) detecting an anomaly associated with the physical parameter in real-time when the measurement of the physical parameter is not within one or more of the upper alarm threshold or the lower alarm threshold; and
iv) preventing booting or rebooting of the target or quiescing a clock in response to detecting the anomaly.

33. The system of claim 32, wherein the at least first processor is configured to further perform an operation comprising changing the threshold based on the anomaly detected in real-time.

34. The system of claim 32, wherein the machine learning model comprises a neural network (NN), a transformer, support-vector machine (SVM), a k-nearest neighbor (KNN) algorithm, or an isolation forest algorithm.

* * * * *